United States Patent
Saling et al.

[11] Patent Number: 5,844,474
[45] Date of Patent: Dec. 1, 1998

[54] VEHICLE OVERLOAD SENSOR

[76] Inventors: Brian Jay Saling; Nanci Ann Saling, both of 23716 Via Tomas, Valencia, Calif. 91355

[21] Appl. No.: 888,264

[22] Filed: Jul. 3, 1997

[51] Int. Cl.[6] ........................................... B60Q 1/00
[52] U.S. Cl. ........................ 340/440; 340/438; 340/666; 177/137; 177/141
[58] Field of Search .................... 340/440, 438, 340/665, 666, 685, 686; 180/290; 177/141, 45, 254, 184, 186, 138

[56] References Cited

U.S. PATENT DOCUMENTS

| | | | |
|---|---|---|---|
| 4,218,672 | 8/1980 | Wesshappel et al. | 340/440 |
| 4,456,084 | 6/1984 | Miller | 177/141 |
| 4,606,419 | 8/1986 | Perini | 177/138 |
| 4,727,352 | 2/1988 | Doller | 340/440 |
| 4,812,806 | 3/1989 | Freeman | 340/440 |
| 4,832,141 | 5/1989 | Perini et al. | 177/141 |
| 5,132,664 | 7/1992 | Feldmann et al. | 340/453 |
| 5,167,289 | 12/1992 | Stevenson | 177/141 |
| 5,522,468 | 6/1996 | Dohrmann et al. | 177/136 |
| 5,525,960 | 6/1996 | McCall et al. | 340/438 |

FOREIGN PATENT DOCUMENTS

| | | | |
|---|---|---|---|
| 002666891A | 3/1992 | France | 180/290 |
| 4000-073-A | 7/1991 | Germany | 180/290 |

*Primary Examiner*—Jeffery A. Hofsass
*Assistant Examiner*—Toan N. Pham

[57] ABSTRACT

A weight overload alarm is provided including a plurality of shock absorbers with at least one having a limit switch. The limit switch is adapted to transmit an actuation signal upon the detection of an excessive weight on the vehicle. A light and an audible alarm are included for actuating upon the receipt of the actuation signal.

4 Claims, 2 Drawing Sheets

VEHICLE OVERLOAD SENSOR

BACKGROUND OF THE INVENTION

1. Field of the Invention

The present invention relates to weight sensors and more particularly pertains to a new VEHICLE OVERLOAD SENSOR for providing an alarm upon detecting an excessive weight being transported.

2. Description of the Prior Art

The use of weight sensors is known in the prior art. More specifically, weight sensors heretofore devised and utilized are known to consist basically of familiar, expected and obvious structural configurations, notwithstanding the myriad of designs encompassed by the crowded prior art which have been developed for the fulfillment of countless objectives and requirements.

Known prior art weight sensors include U.S. Pat. No. 5,410,109; U.S. Pat. No. 4,917,197; U.S. Pat. No. 4,4,491,338; U.S. Pat. No. 4,728,835; U.S. Pat. No. 4,728,922 and U.S. Pat. No. Des. 306,144.

In these respects, the VEHICLE OVERLOAD SENSOR according to the present invention substantially departs from the conventional concepts and designs of the prior art, and in so doing provides an apparatus primarily developed for the purpose of providing an alarm upon detecting an excessive weight being transported.

SUMMARY OF THE INVENTION

In view of the foregoing disadvantages inherent in the known types of weight sensors now present in the prior art, the present invention provides a new VEHICLE OVERLOAD SENSOR construction wherein the same can be utilized for providing an alarm upon detecting an excessive weight being transported.

The general purpose of the present invention, which will be described subsequently in greater detail, is to provide a new VEHICLE OVERLOAD SENSOR apparatus and method which has many of the advantages of the weight sensors mentioned heretofore and many novel features that result in a new VEHICLE OVERLOAD SENSOR which is not anticipated, rendered obvious, suggested, or even implied by any of the prior art weight sensors, either alone or in any combination thereof.

To attain this, the present invention generally comprises a truck bed for supporting a load thereon. The truck bed includes a plurality of tab members coupled to an underside thereof and depending therefrom. An axle associated with the truck bed is also included for allowing the coupling of wheels thereto. As shown in FIG. 1, a plurality of shock absorbers are provided having a first linear portion pivotally coupled at a first end thereof to one of the tab members and a second linear portion pivotally coupled at a first end thereof to the axle. A second end of the second linear portion is slidably situated within a second end of the first linear portion for precluding movement of the axle from being transferred to the truck bed, as is conventional in the art of shock absorbers. Further provided is a linear potentiometer having a first linear portion pivotally coupled at a first end thereof to one of the tab members. The linear potentiometer further has a second linear portion pivotally coupled at a first end thereof to the axle. As shown in FIG. 1, a second end of the first linear portion is slidably situated within a second end of the second linear portion for changing a resistance thereof as a function of a weight situated on the truck bed. It can be further noted from FIG. 1 that each linear potentiometer is positioned adjacent to and in parallel with an adjacent shock absorber. Also included is a limit switch situated within the second linear portion of the linear potentiometer. Note FIG. 2. The limit switch is adapted for closing upon the first linear portion extending within the second linear portion a predetermined distance. The limit switch is further capable of transmitting a voltage greater than a predetermined amount upon the closing thereof. With reference still to FIG. 2, it can be seen that an operational amplifier is provided. The operational amplifier has a positive terminal input connected to the linear potentiometer and a negative terminal input connected to a second potentiometer. The operational amplifier is adapted to transmit at an output thereof a voltage that increases upon the increasing of weight on the truck bed. A light is situated within a cab of the vehicle adjacent the driver and in communication with the output of the operational amplifier and the limit switch. In use, the light is adapted for emitting light upon the receipt of a voltage that surpasses the predetermined amount. Further provided is a one-shot multivibrator in communication with the output of the operational amplifier and the limit switch. The operational amplifier is capable of emitting an activation signal for a predetermined amount of time upon the receipt of a voltage that surpasses the predetermined amount. An audio alarm is situated within a cab of the vehicle adjacent the driver and connected to the multivibrator for emitting an audible alarm only during the receipt of the activation signal. Finally, a double pole single throw switch is provided having a first terminal connected to the light and the multivibrator and a second terminal connected to the limit switch. A third terminal is connected to the output of the operational amplifier. In use, the double pole single throw switch is adapted for selecting the source of the activation signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new VEHICLE OVERLOAD SENSOR apparatus and method which has many of the advantages of the weight sensors mentioned heretofore and many novel features that result in a new VEHICLE OVERLOAD SENSOR which is not anticipated, rendered obvious, suggested, or even implied by any of the prior art weight sensors, either alone or in any combination thereof.

It is another object of the present invention to provide a new VEHICLE OVERLOAD SENSOR which may be easily and efficiently manufactured and marketed.

It is a further object of the present invention to provide a new VEHICLE OVERLOAD SENSOR which is of a durable and reliable construction.

An even further object of the present invention is to provide a new VEHICLE OVERLOAD SENSOR which is susceptible of a low cost of manufacture with regard to both materials and labor, and which accordingly is then susceptible of low prices of sale to the consuming public, thereby making such VEHICLE OVERLOAD SENSOR economically available to the buying public.

Still yet another object of the present invention is to provide a new VEHICLE OVERLOAD SENSOR which provides in the apparatuses and methods of the prior art some of the advantages thereof, while simultaneously overcoming some of the disadvantages normally associated therewith.

Still another object of the present invention is to provide a new VEHICLE OVERLOAD SENSOR for providing an alarm upon detecting an excessive weight being transported.

Even still another object of the present invention is to provide a new VEHICLE OVERLOAD SENSOR that includes a plurality of shock absorbers with at least one having a limit switch. The limit switch is adapted to transmit an actuation signal upon the detection of an excessive weight on the vehicle. A light and an audible alarm are included for actuating upon the receipt of the actuation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
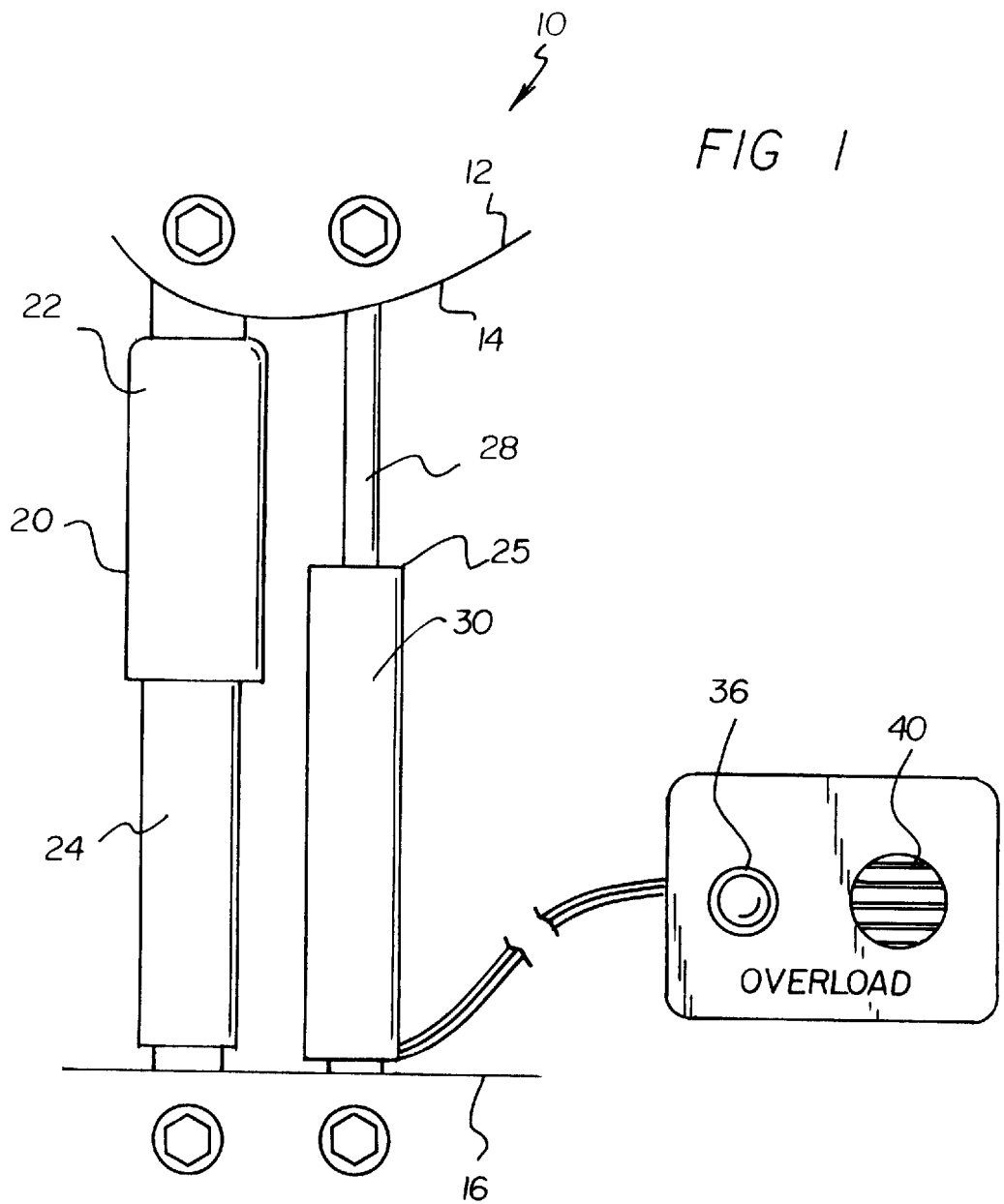
FIG. 1 is front view of a new VEHICLE OVERLOAD SENSOR according to the present invention.

With reference now to the drawings, a new VEHICLE OVERLOAD SENSOR embodying the principles and concepts of the present invention and generally designated by the reference numeral 10 will be described.

Specifically, the system 10 of the present invention includes a truck bed 12 for supporting a load thereon. The truck bed includes a plurality of tab members 14 coupled to an underside thereof and depending therefrom. An axle 16 associated with the truck bed is also included for allowing the coupling of wheels thereto.

As shown in FIG. 1, a plurality of shock absorbers 20 are provided having a first linear portion 22 pivotally coupled at a first end thereof to one of the tab members and a second linear portion 24 pivotally coupled at a first end thereof to the axle. A second end of the second linear portion is slidably situated within a second end of the first linear portion for precluding movement of the axle from being transferred to the truck bed, as is conventional in the art of shock absorbers.

Further provided is a linear potentiometer 25, or linear voltage dimensional transducer, having a first linear portion 28 pivotally coupled at a first end thereof to one of the tab members. The linear potentiometer further has a second linear portion 30 pivotally coupled at a first end thereof to the axle. As shown in FIG. 1, a second end of the first linear portion is slidably situated within a second end of the second linear portion for changing a resistance thereof as a function of a weight situated on the truck bed. It can be further noted from FIG. 1 that each linear potentiometer is positioned adjacent to and in parallel with an adjacent shock absorber.

Also included is a limit switch 32 situated within the second linear portion of the linear potentiometer. Note FIG. 2. The limit switch is adapted for closing upon the first linear portion extending within the second linear portion a predetermined distance whereat it abuts the limit switch. The limit switch is further capable of transmitting a voltage greater than a predetermined amount upon the closing thereof. This is accomplished by means of a voltage source connected to the limit switch.

Figure 2:
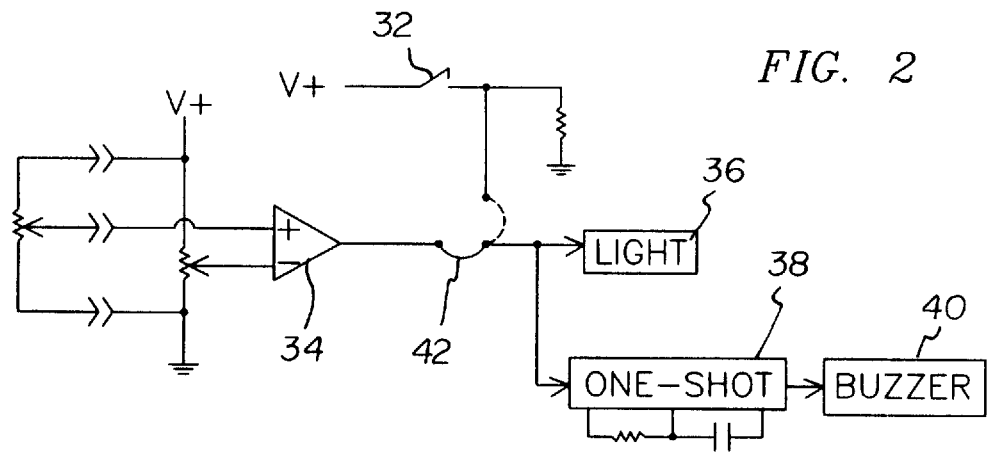
FIG. 2 is a schematic diagram of the preferred embodiment of the present invention.

With reference still to FIG. 2, it can be seen that an operational amplifier 34 is provided. The operational amplifier has a positive terminal input connected to the linear potentiometer and a negative terminal input connected to a second potentiometer. The connection of the linear potentiometer is preferably afforded with an adapter, as shown in FIG. 2. The operational amplifier is adapted to transmit at an output thereof a voltage that increases upon the increasing of weight on the truck bed. It should be noted that the second potentiometer allows for the adjustment of the weight at which the voltage of the predetermined amount is afforded. The criticality of such will become apparent hereinafter.

A light 36 is situated within a cab of the vehicle adjacent the driver and in communication with the output of the operational amplifier and the limit switch. In use, the light is adapted for emitting light upon the receipt of a voltage that surpasses the predetermined amount.

Further provided is a one-shot multivibrator 38 in communication with the output of the operational amplifier and the limit switch. The operational amplifier is capable of emitting an activation signal for a predetermined amount of time upon the receipt of a voltage that surpasses the predetermined amount.

An audio alarm 40 is situated within a cab of the vehicle adjacent the driver and connected to the multivibrator for emitting an audible alarm only during the receipt of the activation signal.

Finally, a double pole single throw switch 42 is provided having a first terminal connected to the light and the multivibrator and a second terminal connected to the limit switch. A third terminal is connected to the output of the operational amplifier. In use, the double pole single throw switch is adapted for selecting the source of the activation signal. In the preferred embodiment, the double pole single throw switch is accessible to the driver in the cab.

Figure 3:
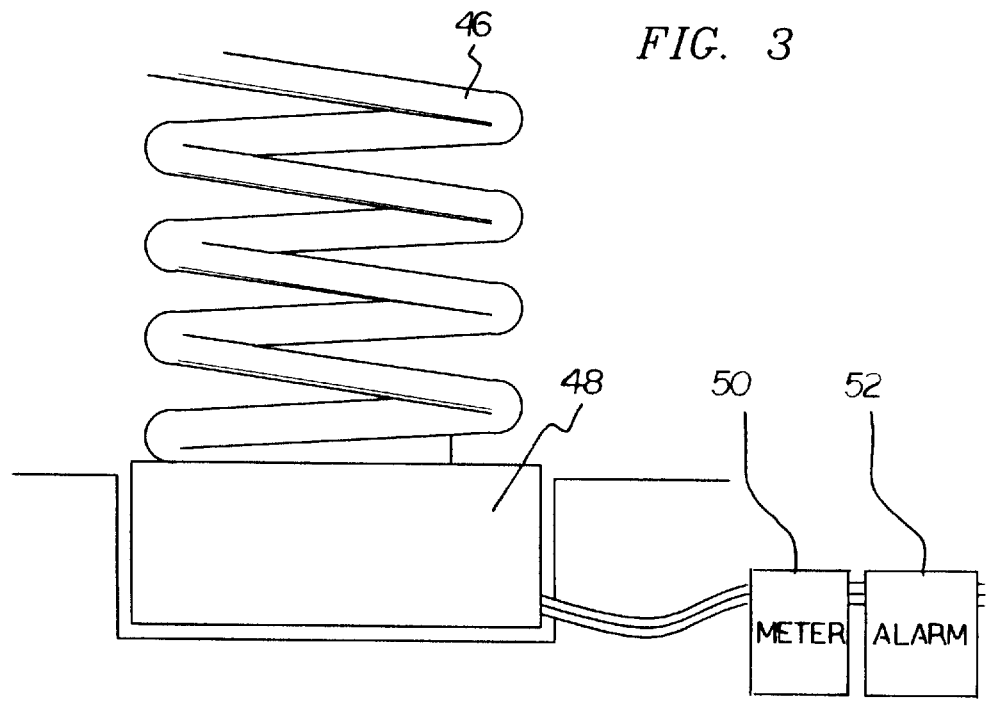
FIG. 3 is a side view of an alternate embodiment of the present invention.

In an alternate embodiment, the axle has a recess 44 formed therein for supporting a shock absorbing spring 46. Note FIG. 3. Situated below the spring is a load gauge 48 for transmitting a signal which is representative of a weight supported by the spring which is in turn indicative of the load. A meter 50 is also included for visually displaying the weight associated with the signal. Similar to the previous embodiment, the embodiment of FIG. 3 has alarm means 52 for alerting a user upon the weight surpassing a predetermined amount.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A weight overload alarm comprising, in combination:

a vehicle for supporting a load thereon, the vehicle having a plurality of tab members coupled to an underside thereof and depending therefrom;

an axle for allowing the coupling of wheels thereto;

a plurality of shock absorbers having a first linear portion pivotally coupled at a first end thereof to one of the tab members and a second linear portion pivotally coupled at a first end thereof to the axle wherein a second end of the second linear portion is slidably situated within a second end of the first linear portion for precluding movement of the axle from being transferred to the vehicle;

a linear potentiometer having a first linear portion pivotally coupled at a first end thereof to one of the tab members and a second linear portion pivotally coupled at a first end thereof to the axle wherein a second end of the first linear portion is slidably situated within a second end of the second linear portion for changing a resistance thereof as a function of a weight situated on the vehicle, whereby each linear potentiometer is positioned adjacent to and in parallel with an adjacent shock absorber;

a limit switch situated within the second linear portion of the linear potentiometer for closing upon the first linear portion extending within the second linear portion a predetermined distance, the limit switch adapted to transmit a voltage greater than a predetermined amount upon the closing thereof;

a second potentiometer;

an operational amplifier having a positive terminal input connected to the linear potentiometer and a negative terminal input connected to the second potentiometer, the operational amplifier adapted to transmit at an output thereof a voltage that increases upon the increasing of weight on the vehicle;

a light situated within a cab of the vehicle adjacent the driver and in communication with the output of the operational amplifier and the limit switch for emitting light upon the receipt of a voltage that surpasses the predetermined amount;

a one-shot multivibrator in communication with the output of the operational amplifier and the limit switch for emitting an activation signal for a predetermined amount of time upon the receipt of a voltage that surpasses the predetermined amount;

an audio alarm situated within a cab of the vehicle adjacent the driver and connected to the multivibrator for emitting an audible alarm only during the receipt of the activation signal; and a double pole single throw switch having a first terminal connected to the light and the multivibrator, a second terminal connected to the limit switch and a third terminal connected to the output of the operational amplifier, the double pole single throw switch adapted for selecting the source of the activation signal.

2. A weight overload alarm comprising:

a vehicle for supporting a load thereon, the vehicle having a plurality of tab members coupled to an underside thereof and depending therefrom;

an axle for allowing the coupling of wheels thereto;

a plurality of shock absorbers having a first linear portion pivotally coupled at a first end thereof to one of the tab members and a second linear portion pivotally coupled at a first end thereof to the axle wherein a second end of the second linear portion is slidably situated within a second end of the first linear portion for precluding movement of the axle from being transferred to the vehicle;

a linear housing having a first linear portion pivotally coupled at a first end thereof to one of the tab members and a second linear portion pivotally coupled at a first end thereof to the axle wherein a second end of the first linear portion is slidably situated within a second end of the second linear portion, whereby each linear housing is positioned adjacent to and in parallel with an adjacent shock absorber;

a limit switch situated within the second linear portion of the linear housing for closing upon the first linear portion extending within the second linear portion a predetermined distance, the limit switch adapted to transmit an actuation signal upon the closing thereof;

a light situated within a cab of the vehicle adjacent the driver and in communication with the limit switch for emitting light upon the receipt of the actuation signal.

3. A weight overload alarm as set forth in claim 2 wherein a linear potentiometer resides within the linear housing for changing a resistance thereof as a function of a weight situated on the vehicle; and further including:

a second potentiometer;

an operational amplifier having a positive terminal input connected to the linear potentiometer and a negative terminal input connected to the second potentiometer, the operational amplifier adapted to transmit the actuation signal upon the detection of a weight on the vehicle that surpasses the predetermined amount; and a double pole single throw switch having a first terminal connected to the light, a second terminal connected to the limit switch and a third terminal connected to the output of the operational amplifier, the double pole single throw switch adapted for selecting the source of the actuation signal.

4. A weight overload alarm comprising:

an axle with a recess formed therein for supporting a spring that absorbs shock experienced by a vehicle;

a load gauge situated below the spring for transmitting a signal which is representative of a weight supported by the spring which is in turn indicative of the load;

a meter included for visually displaying a weight associated with the signal; and alarm means for alerting a user upon the weight surpassing a predetermined amount.

* * * * *